(No Model.)
O. YOST.
COMBINED SHEEP RACK AND TROUGH.
No. 250,622. Patented Dec. 6, 1881.
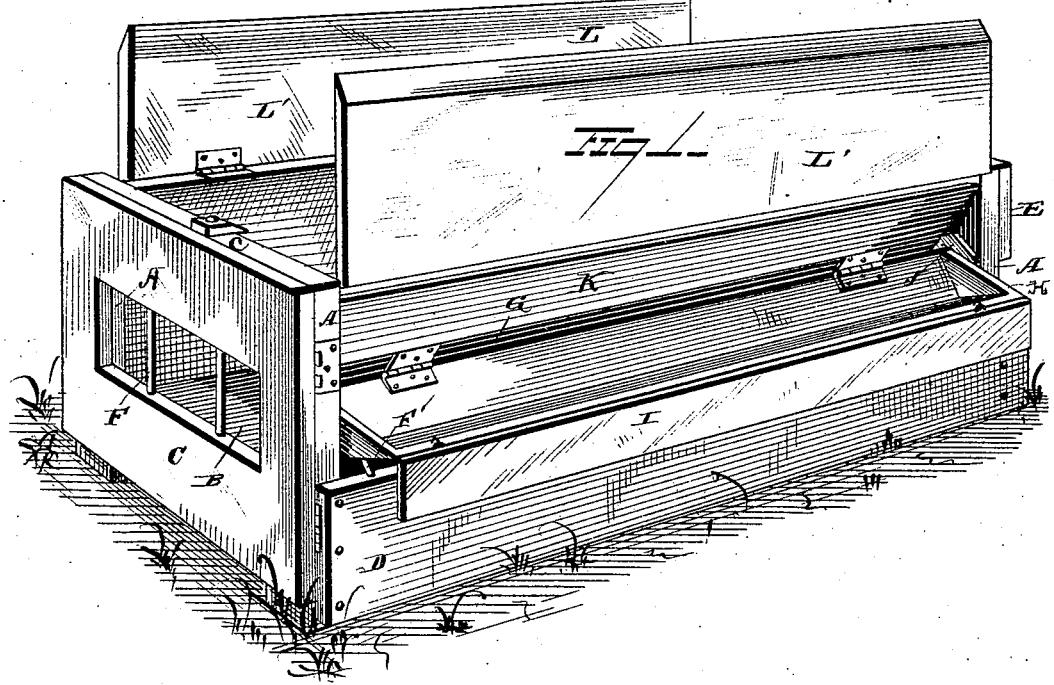
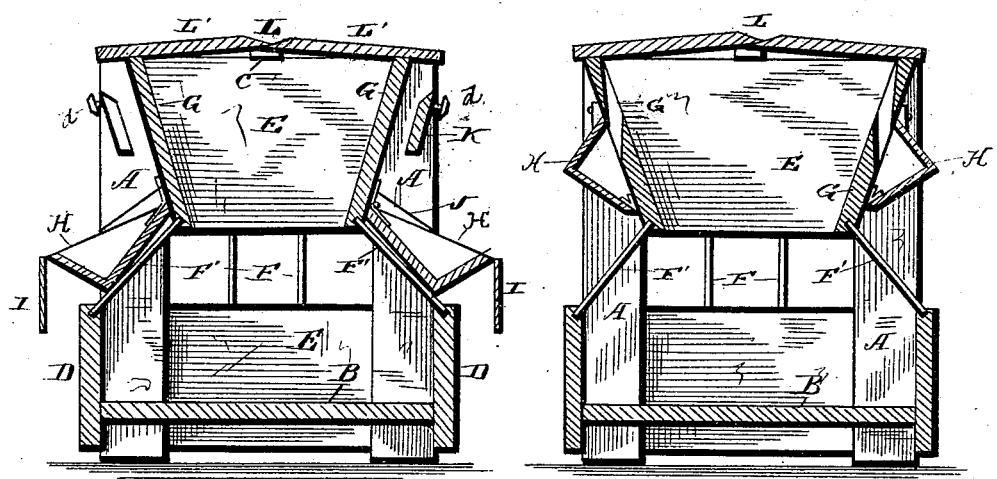
WITNESSES
INVENTOR
Olwin Yost.
ATTORNEY

UNITED STATES PATENT OFFICE.

OLIVER YOST, OF MASSILLON, OHIO.

COMBINED SHEEP RACK AND TROUGH.

SPECIFICATION forming part of Letters Patent No. 250,622, dated December 6, 1881.

Application filed October 4, 1881. (No model.)

*To all whom it may concern:*

Be it known that I, OLIVER YOST, of Massillon, in the county of Stark and State of Ohio, have invented certain new and useful Improvements in Combined Sheep Racks and Troughs; and I do hereby declare the following to be a full, clear, and exact description of the invention, such as will enable others skilled in the art to which it pertains to make and use the same.

My invention relates to an improvement in feed-racks for sheep, the object of the same being to combine therewith feed-troughs so constructed and attached that they can be placed in a position suitable for feeding grain, &c., after which they can be raised out of the way and held in position by suitable means. When the troughs are thus secured the animals have easy access to whatever the rack may contain, while the troughs are kept free from snow, rain, dirt, &c.

With these ends in view my invention consists in certain details in construction and combination of parts, as will be more fully explained, and pointed out in the claims.

In the accompanying drawings, Figure 1 is a perspective view of the rack with the troughs and top open. Fig. 2 is a transverse vertical section with the troughs and top in closed and locked position, and Fig. 3 is a transverse vertical sectional view of a modification.

A represents four upright standards, connected and held together by the side pieces D and the end E. B is the floor or platform, and C a door, provided centrally with the bars F, by which the contents can be reached from the outside. This door is of the same height as the rack, and is adapted to be opened when it is desired to clean the interior of the rack of any refuse material. The standards A are also continued up to the top of the rack, and are beveled off at their internal upper ends to form bearings for the side pieces G, which latter are secured thereto in an inclined position, in any desired manner, with their lower edges or sides connected to the vertical side pieces D through the intervention of the inclined bars F'. These bars F' are secured to the side pieces, G and D, in any suitable manner, and are situated sufficient distances apart to allow the animals to reach the contents of the rack. The end E opposite the door C is rigidly attached to the standards A, and is provided centrally with bars F, similar to the said door, and adapted to answer the same purpose.

The troughs H are constructed of any suitable material, and are pivotally secured to the side pieces G between the standards A, or to the said standards, and are adapted, when in an open position, to rest on the bars F' and cover the openings between them, thereby preventing the animals from getting at the contents of the rack when the troughs are down. These troughs are either hinged to the side pieces G, as shown in the drawings, or pivoted to the standard A, as desired, which will answer the necessary purpose.

I are covers hinged to the outer edges of the troughs, and when the troughs are being filled are adapted to be thrown up and rest on the inclined shoulders J on the sides of standards, thereby partly closing the troughs and preventing the animals from getting to the grain before the filling is completed.

K are boards secured to the sides of the rack between the standards A, parallel to the inclined side pieces G, and with a suitable space intervening between them, through which the grain is introduced from above. When the hinged lid or cover I of the trough is thrown up on the shoulders J the upper end reaches up to or slightly above the lower edge of the board K, thereby forming a continuous chute to the trough, which allows it to be filled without the trouble and delay experienced in feeding sheep from racks as ordinarily constructed. When the troughs are ready to be closed the cover I is thrown back and the trough turned up alongside of the side piece, where it is secured by any suitable means. When the troughs are in this position it is impossible for dirt, snow, or rain to congregate therein, and consequently they are always ready for use.

The top or cover L is formed of two parts, L', hinged to the side pieces, and are adapted to be held in an inclined closed position by suitable supports, c, with their outer edges extending sufficiently over the sides of the rack to carry off the rain without allowing it to run down the sides of the rack. The top can also be thrown up, as shown in Fig. 1, or the sides can be dropped inward when it is desired to fill the rack or sun the contents.

By constructing the rack as above described the hay can easily be introduced from the top, the position of the bars or rounds F' being such that they keep the hay, &c., from falling out and being wasted, and by the use of the hinged cover I and board K, I am enabled to keep the animals from the feed until all is in readiness without inconvenience, and also avoiding the loss of grain occasioned by other arrangements.

When the trough is not in use it is raised up, the open top of same resting against the side piece G, and is held in position thereon by a button, d, secured to the upper edge of the board K.

The construction of my rack is such that the animals cannot take the hay from above, or by reaching up, but take it from below, which is their natural position while feeding, while at the same time it prevents the hay from falling out, and also prevents it from getting into the trough or becoming entangled in the wool of the animal.

In the modification shown in Fig. 3 the extra board is done away with and an oblong vertical opening is made through the side piece, through which the grain is introduced from the inside.

My device is simple in construction, efficient in operation, of small first cost, and is adapted to be placed on runners or wheels, by which it can be transported from place to place.

Having fully described my invention, what I claim as new, and desire to secure by Letters Patent, is—

1. In a combined feed rack and trough, the combination, with the beveled standards A, the side piece G, and a pivotally-supported trough, H, adapted to rest upon the bars F', and also to be turned up away from said bars, of a chute for filling the trough, substantially as set forth.

2. In a combined feed rack and trough, the combination, with the standards, ends, and the pivoted trough, of the inclined piece G, having an elongated slot, through which the trough may be filled, substantially as set forth.

3. The combination, with the standards A, side pieces D, ends E and C, hinged covers L, inclined side pieces G, and bars F', of the pivoted troughs H, secured in any suitable manner to the sides of the rack, and adapted, when in an open position, to rest on the said bars, thereby preventing the animals from getting at the contents of the rack, substantially as set forth.

4. The combination, with the standards A, having their internal upper faces beveled, to which are secured in an inclined position the pieces G, the side pieces D, end E, door C, bars F', two-part cover L, hinged to the inclined side pieces, and buttons c, for holding the said two-part top in an inclined position, of troughs H, hinged to the sides of the rack in any desired manner, and means for holding said trough up from the said bars F', so as to allow the animals access to the contents of the rack, substantially as set forth.

5. In a combined feed rack and trough, the combination, with the inclined side pieces G, secured to the standards in any suitable manner, of the side pieces D, inclined bars F', connecting the side pieces, and the piece K, secured to the standards A in such a manner as to form a chute of the troughs pivotally secured to the rack under the piece G, and provided with a hinged cover, I, which latter is adapted to rest on the shoulders J and close the troughs when it is desired to fill the same, substantially as set forth.

In testimony whereof I have signed this specification in the presence of two subscribing witnesses.

OLIVER YOST.

Witnesses:
HERMAN MORAN,
A. W. BRIGHT.